(12) United States Patent
Philipzik et al.

(10) Patent No.: US 12,202,563 B2
(45) Date of Patent: Jan. 21, 2025

(54) HOLDING DEVICE FOR RELEASABLY HOLDING AN ENERGY STORE ON A FRAME

(71) Applicant: Robert Bosch GmbH, Stuttgart (DE)

(72) Inventors: Fabian Philipzik, Tuebingen (DE); Peter Kunert, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 356 days.

(21) Appl. No.: 17/633,501

(22) PCT Filed: Sep. 2, 2020

(86) PCT No.: PCT/EP2020/074418
§ 371 (c)(1),
(2) Date: Feb. 7, 2022

(87) PCT Pub. No.: WO2021/043798
PCT Pub. Date: Mar. 11, 2021

(65) Prior Publication Data
US 2022/0289328 A1 Sep. 15, 2022

(30) Foreign Application Priority Data
Sep. 4, 2019 (DE) ...................... 10 2019 213 439.4

(51) Int. Cl.
*B62M 6/90* (2010.01)
*B62J 43/13* (2020.01)
(Continued)

(52) U.S. Cl.
CPC ............... *B62J 43/28* (2020.02); *B62J 43/13* (2020.02); *B62K 19/40* (2013.01); *B62M 6/90* (2013.01)

(58) Field of Classification Search
CPC . B62J 43/28; B62J 43/13; B62J 43/20; B62K 19/40; B62M 6/90; B62H 5/001
See application file for complete search history.

(56) References Cited

U.S. PATENT DOCUMENTS

| 8,220,679 B2 * | 7/2012 | Yoshida | ............... | H01M 50/202 |
| | | | | 429/96 |
| 8,979,110 B2 * | 3/2015 | Talavasek | ................ | B62M 6/60 |
| | | | | 280/279 |

(Continued)

FOREIGN PATENT DOCUMENTS

| CN | 2874781 Y | 2/2007 |
| CN | 203332333 U | 12/2013 |

(Continued)

OTHER PUBLICATIONS

International Search Report for PCT/EP2020/074418, Issued Dec. 8, 2020.

*Primary Examiner* — John D Walters
(74) *Attorney, Agent, or Firm* — NORTON ROSE FULBRIGHT US LLP; Gerard A. Messina (57) ABSTRACT

A holding device for releasably holding an energy store, in particular, a bicycle energy store, at a frame, in particular, at a bicycle frame. The holding device includes at least one carrier unit, which includes at least one carrier element, in particular, a guide bar for at least partially receiving and/or guiding the energy store, and including at least one support unit for securing the energy store in a form-fit manner at the carrier unit. The support unit includes at least one support element situated at the carrier element, which secures the energy store at the carrier element in a state in which the energy store is situated at the carrier element at least along a direction extending transversely to a longitudinal axis of the carrier element.

11 Claims, 9 Drawing Sheets

(51) Int. Cl.
*B62J 43/28* (2020.01)
*B62K 19/40* (2006.01)

(56) References Cited

U.S. PATENT DOCUMENTS

| | | | |
|---|---|---|---|
| 9,399,499 | B2 | 7/2016 | Honda et al. |
| 10,351,013 | B2* | 7/2019 | Shieh ................. B62M 6/40 |
| 11,024,917 | B2* | 6/2021 | Trif ..................... B62M 6/90 |
| 11,161,567 | B2* | 11/2021 | Eguchi ............... B62K 19/40 |
| 2012/0322321 | A1 | 12/2012 | Kwag et al. |
| 2015/0114734 | A1 | 4/2015 | Ogawa |
| 2015/0158551 | A1 | 6/2015 | Ogawa |
| 2015/0367911 | A1 | 12/2015 | Chu et al. |
| 2018/0006278 | A1* | 1/2018 | Shimoda ............ H01M 50/202 |
| 2022/0081049 | A1* | 3/2022 | Schumacher ........ B62H 5/001 |

FOREIGN PATENT DOCUMENTS

| | | |
|---|---|---|
| CN | 203536484 U | 4/2014 |
| CN | 208173668 U | 11/2018 |
| CN | 109066005 A | 12/2018 |
| DE | 102005016043 A1 | 5/2006 |
| DE | 102010023512 A1 | 12/2011 |
| DE | 102016001325 A1 | 9/2016 |
| DE | 202016104758 U1 | 12/2017 |
| DE | 102016010261 A1 | 3/2018 |
| DE | 202017104231 U1 | 4/2018 |
| DE | 102018105710 A1 | 9/2018 |
| EP | 1911666 A1 | 4/2008 |
| EP | 3118096 A1 | 1/2017 |
| EP | 3521153 A1 | 8/2019 |
| WO | 2016008616 A1 | 1/2016 |

* cited by examiner

HOLDING DEVICE FOR RELEASABLY HOLDING AN ENERGY STORE ON A FRAME

BACKGROUND INFORMATION

A holding device for releasably holding an energy store at a frame, including at least one carrier unit that includes at least one carrier element for at least partially receiving and/or guiding the energy store, and including at least one support unit for securing the energy store at the carrier unit in a form-fit manner is conventional.

SUMMARY

The present invention is directed to a holding device for releasably holding an energy store, in particular, a bicycle energy store, at a frame. In accordance with an example embodiment of the present invention, the holding device includes at least one carrier unit that includes at least one carrier element, in particular, a guide bar, for at least partially receiving and/or guiding the energy store, and includes at least one support unit for securing the energy store at the carrier unit in a form-fit manner.

In accordance with an example embodiment of the present invention, it is provided that the support unit includes at least one support element situated at the carrier element, which secures the energy store at the carrier element in a state in which the energy store is situated at the carrier element at least along a direction extending transversely to a longitudinal axis of the carrier element.

The holding device is designed preferably as a bicycle energy store holding device. The holding device preferably includes a contacting unit for electrically contacting the energy store in the state in which the energy store is situated at the carrier element. The contacting unit preferably includes at least one contacting element that includes at least one electrically positive pole and at least one electrically negative pole. The energy store includes, in particular, at least one contacting element corresponding to the contacting element. The contacting element of the contacting unit and/or the contacting element of the energy store is/are preferably mounted in a floating manner. Mounting tolerances, in particular, may be compensated for in a holder of the energy store.

The energy store may be designed, in particular, as a gas tank and/or liquid tank. The energy store may be designed, in particular, as an electrochemical capacitor and/or as a fuel cell, preferably, the energy store is designed as a storage battery, in particular, as an accumulator, preferably as a bicycle accumulator. The energy store is provided, in particular, to provide energy for a drive unit of a bicycle, for example for an auxiliary motor of an E-bike or of a Pedelec.

The carrier element may, in particular, form the entire carrier unit. The carrier element is integrated preferably into a load path of the frame. A weight reduction of the frame and/or an increase in the stiffness of the frame, in particular, may be achieved. Additional components for stiffening the frame, in particular, may be advantageously dispensed with. The carrier unit may include, in particular, at least one carrier frame, which is connected to the frame and preferably supports the carrier element. The carrier element is preferably glued to, welded to, soldered to, screwed to, riveted to the carrier frame and/or the frame or is connected to the frame in some other manner appearing meaningful to those skilled in the art. The contacting unit is preferably situated at the carrier frame, in particular, fixed thereto. The carrier frame preferably encompasses at least partially an outer surface of the energy store in the state in which the energy store is situated at the carrier element.

In accordance with an example embodiment of the present invention, at least one elongate element, for example, a cable, a tube, and/or a Bowden cable is advantageously guided past the carrier element along the longitudinal axis of the carrier element in a lateral close range of the carrier element. The holding device, in particular, the carrier element, particularly advantageously includes at least one holder for the elongate element. A high degree of compactness, in particular, may be achieved.

It is possible that the carrier unit includes a plurality of carrier elements. The carrier unit preferably includes exactly one carrier element. The energy store, in the state in which the energy store is situated at the carrier element, preferably covers all points at which the carrier element is fastened to the frame. For example, the energy store, in the state in which it is situated at the carrier element, could cover all screws with which the carrier element is screwed onto the frame. An aesthetic appearance and a high degree of theft protection may be achieved. It is possible that the holding device, preferably the carrier unit or the carrier element, is designed at least partially as one piece with the frame or at least a part of the holding device is connected, for example, welded or bonded, as one piece to the frame. The carrier element may, in particular, be integrally designed with the frame. "Integrally" is understood to mean, in particular, formed in one piece. This one piece is preferably produced from one single blank, from a compound and/or a cast, particularly preferably in an injection molding method, in particular, in a single component and/or multicomponent injection molding method. The carrier element is particularly preferably provided to receive and/or to guide the entire energy store. It is possible that the carrier element is intended merely to receive and/or guide an end area of the energy store which, in the state in which the energy store is situated at the carrier element, is connected to the contacting unit. "Intended" is understood to mean specifically designed and/or specifically equipped. An object being provided for a particular function is understood to mean, in particular, that the object fulfills and/or carries out this particular function in at least one application state and/or operating state. "Intended" is, in particular, not understood to mean mere suitability.

The support element is situated, in particular, at a side of the carrier element facing the energy store in the state in which the energy store is situated at the carrier element. The support element preferably includes at least one form-fit extension, which is provided to engage in a form-fit manner in the energy store or in a further support element of the support unit situated at the energy store. It is also possible that a form-fit extension is situated at the energy store, which is provided for engaging in a support element of the support unit designed as a recess, in particular, to enable a safeguarding of the energy store along the direction extending transversely to the longitudinal axis of the carrier element. "Transversely" is understood to mean, in particular, an orientation of a direction and/or of an axis relative to a reference direction and/or to a reference axis, the orientation of the direction and/or of the axis being at least different from an at least essentially parallel orientation of the reference direction and/or of the reference axis and, in particular, is skewed or perpendicular to the reference direction and/or to the reference axis.

The support element preferably guides the energy store when situating the energy store at the carrier element, in particular, along the longitudinal axis of the carrier element. "Situating the energy store at the carrier element" is understood to mean, in particular, an operational action, which transfers the energy store from a released state into the state in which the energy store is situated at the carrier element. Situating the energy store includes at least inserting and/or pivoting and/or tilting the energy store into the recess of the frame. Situating the energy store preferably includes at least a relative movement of the energy store with respect to the carrier element along the longitudinal axis of the carrier element, particularly advantageously following at least an inserting and/or pivoting and/or tilting of the energy store into the recess of the frame. The support element may, in particular, form the entire support unit. "Form-fit" is understood to mean, in particular, that abutting surfaces of components connected to one another in a form-fit manner exert a holding force on one another acting in the normal direction of the surfaces. The components are located, in particular, in a geometrical engagement with one another. The energy store being "secured" along one direction is understood to mean, in particular, that a movement of the energy store is at least essentially blocked along that direction. The movement of the energy store being "at least essentially blocked" is understood to mean, in particular, that the energy store is movable along at least one direction by no more than 15%, advantageously by no more than 10%, and particularly advantageously by no more than 5%, of a maximum total extent of the energy store.

It is possible that the support unit includes at least one locking element, which is provided to fix the energy store in the state in which the energy store is situated at the carrier element, preferably releasably, along the longitudinal axis of the carrier element. For example, the locking element could be designed as a pressure piece, in particular, as a ball pressure piece and/or as a detent element.

The support element may, for example, have a rectangular, in particular, cuboidal shape as viewed perpendicularly to a main extension plane of the support element. A "main extension plane" of a component is understood to mean, in particular, a plane, which is parallel to a largest side surface of a smallest possible possible cuboid, which only just completely encloses the component, and in particular, extends through the midpoint of the cuboid. It is possible that the support element has a shape, which corresponds at least essentially to a cuboid or to a cube and/or to a cylinder. The support element and/or the carrier element could, for example, be manufactured by a stamping method and/or by an embossing method and/or by a laser method and/or by a water jet method and/or by a forging method and/or by an injection molding method and/or by a casting method and/or by a machining method. A secure holding of the energy store, in particular, may be achieved by the embodiment of the holding device according to the present invention. Damage to the holding device by transverse forces and/or torques and/or weight forces may be advantageously largely avoided as a result of the support element.

It would be possible for the support element to be designed separately from the carrier element and, in particular, releasably connected to the carrier element. For example, the support element could be glued and/or screwed and/or riveted onto the carrier element. To achieve a simple and cost-efficient manufacture of the holding device, it is provided to design the support element and the carrier element as one piece. A main extension plane of the support element extends preferably in parallel to the longitudinal axis of the carrier element. The support element is preferably connected to the carrier element within an overlapping area of the support element and of the carrier element, in particular, at a midpoint of the support element, as viewed perpendicularly to the main extension plane of the support element, and extends, in particular, transversely to the longitudinal axis of the carrier element beyond the carrier element. Additional manufacturing steps for fastening the support element at the carrier element may be advantageously dispensed with. A robustness of the support element and of the carrier element may be particularly advantageously enhanced.

In accordance with an example embodiment of the present invention, it is further provided that the support element has a shape tapering toward the end areas of the support element, as viewed along the longitudinal axis of the carrier element. The support element is, in particular, at least curved and/or at least slanted toward the end areas. The support element could have, in particular, an at least essentially triangular and/or hexagonal and/or trapezoidal and/or oval, in particular circular, shape as viewed perpendicularly to a main extension plane of the support element. A simple and secure arrangement of the energy store at the carrier element may be advantageously achieved. An effort during a relative movement of the energy store with respect to the carrier element along the longitudinal axis of the carrier element may be advantageously minimized. A convenient guidance of the energy store during a relative movement may be particularly advantageously achieved.

In accordance with an example embodiment of the present invention, to enable a simple arrangement of the energy store at the carrier element, it is provided that the support element includes at least one insert element for securely inserting the energy store transversely, in particular perpendicularly, to the longitudinal axis of the carrier element and preferably perpendicularly to the main extension plane of the support element. The insert element is preferably designed as an end area of the support element, which is designed facing the energy store in the state in which the energy store is situated at the carrier element and tapering toward the energy store. The support element is, in particular, curved and/or at least slanted toward the end area. For example, the support element could have a shape that corresponds at least essentially to a semi-ovoid, in particular, to a hemisphere and/or to a pyramid. The support element preferably has a shape that corresponds at least essentially to an ovoid ring, in particular, a ball ring. In this way, the arrangement of the energy store at the carrier element, in particular, may be further simplified. A guidance of the energy store when inserting and/or pivoting and/or tilting the energy store in may be improved.

In accordance with an example embodiment of the present invention, it is also provided that the support element includes at least one slide element. A "slide element" is understood to mean, in particular, an element that is provided for reducing a friction when sliding two further elements overlying one another. For example, the slide element could be designed as a sub-area of the support element, which is smoothed, in particular, lapped. For example, the slide element could be designed as a sub-area of the support element, which includes at least one material having a low friction coefficient. A material including a "low friction coefficient" is understood to mean, in particular, that during a dry sliding movement of a steel body on the material, the material has a friction coefficient of no more than 0.5, preferably of no more than 0.3 and particularly preferably of no more than 0.1. For example, the slide element could include a copper alloy and/or Teflon and/or Badamid and could advantageously be completely made of the copper alloy or Teflon or Badamid. The slide element could, in particular, be designed as a coating of the support element. The support element is preferably completely formed by the slide element. A convenient arrangement of the energy store at the carrier element may be advantageously achieved. An effort when arranging the energy store may be advantageously minimized.

In accordance with an example embodiment of the present invention, it is further provided that the support unit includes a plurality, in particular an arbitrary number, of support elements situated at the carrier element which are situated in a distributed manner along the longitudinal axis of the carrier element, in particular, situated in an arbitrarily distributed manner. It would be possible that a number and/or an arrangement of the support elements is/are adaptable. The support elements are each advantageously spaced, preferably periodically, apart from one another. In addition, in particular, to a connection via the carrier element, individual elements could alternatively be connected to one another, for example, via at least one web. A number of the support elements is, in particular, a function of a length of the energy store with respect to a longitudinal axis of the energy store. For example, a support element may be situated centrally at the carrier element with respect to the longitudinal axis of the carrier element, in order to receive and/or guide at least one energy store, whose length with respect to a longitudinal axis of the energy store is shorter than a length of the carrier element with respect to the longitudinal axis of the carrier element, and, in particular, is no more than half the length of the carrier element. A convenient guidance of the energy store when arranging the energy store at the carrier element may be advantageously achieved. In this way, the energy store may, in particular, be secured at multiple points along its length.

In addition, it is provided that the support element is designed as an undercut. The undercut is preferably provided to form a form-fit with a further element, which at least essentially prevents a relative movement of the undercut relative to the further element perpendicular to an insertion direction. The form-fit "at least essentially preventing" the relative movement is understood in this context to mean, in particular, that the two elements are movable relative to one another perpendicular to the insertion direction by no more than 15%, advantageously by no more than 10% and particularly advantageously by no more than 5% of an extent of both elements perpendicular to the insertion direction. The two elements are, in particular, moveable relative to one another within manufacturing tolerances and/or mounting tolerances perpendicular to the insertion direction. For example, the support element could be designed as a dovetail or as a T-bar or as a double T-bar. The support element could extend, in particular, along the longitudinal axis of the carrier element over at least a major portion of the carrier element, in particular, over the entire carrier element. A reliable safeguarding of the energy store may be advantageously achieved. The energy store may be advantageously secured by simple and intuitive operational actions.

It is possible that the energy store includes an integrated receptacle for the support element. To achieve a high degree of flexibility when arranging the energy store at the carrier element, it is provided that the support unit includes at least one security bar element, which includes at least one receiving area for the support element and support areas for the support element situated along its longitudinal axis adjacent to the receiving area. The support areas are, in particular, designed identically to one another. The security bar element includes, in particular, a periodic arrangement of receiving areas and support areas. The security bar element is particularly advantageously provided for, preferably releasably, fastening at the energy store, preferably at an end of the energy store. For example, the security bar element could be capable of being screwed to and/or glued to and/or riveted to and/or welded to and/or attached to the energy store. The security bar element may, in particular, encompass the end of the energy store in a mounted state of the security bar element. The security bar element includes preferably at least one locking element, which is involved in fixing the energy store at the carrier element in the state in which the energy store is situated at the carrier element, and is preferably coupled to further locking elements. The support areas of the security bar elements each preferably define a recess for a support element designed as an undercut. Alternatively to an insertion of the energy store along the longitudinal axis of the carrier element, a placement and/or a pivoting and/or a tilting of the energy store, followed by a shifting of the energy store along the longitudinal axis of the carrier, may be used for arranging the energy store at the carrier element. A manner of inserting the energy store may be advantageously selected, which offers a high degree of operating convenience.

A frame, in particular, a bicycle frame including a holding device according to the present invention is further provided. This may improve the convenience when arranging the energy store at the carrier element. A "frame" is understood in this context to mean, in particular, a unit, which defines a cohesive and preferably supporting structure. The frame advantageously includes at least one elongate element, the frame is particularly advantageously formed completely by elongate elements. An "elongate element" is understood in this context to mean, in particular, an element in which the smallest possible cuboid, which is just able to receive the element, has a length that is at least five times, advantageously at least ten times, and particularly preferably at least fifteen times, a width and a height of the cuboid. The frame may include, in particular, at least one recess for receiving the holding device, in particular, the carrier element, and the energy store. The recess may, for example, be designed as an indentation or as a cavity in the frame. By at least partially arranging the holding device, in particular, the carrier element, within a cavity of the frame, it is possible to improve, in particular, an appearance of the frame in the state of the energy store in which it is situated at the carrier element, and/or to reduce a wall thickness of the frame and/or to prevent a penetration of contaminants and/or liquids into the energy store. The arrangement of the holding device and/or of the carrier element within the cavity is particularly advantageous in an embodiment of the frame as a lightweight frame, for example, a carbon frame.

The holding device according to the present invention and the bicycle frame according to the present invention are not restricted here to the above-described application and specific embodiment. The holding device according to the present invention and the bicycle frame according to the present invention may, in particular, include a number differing from a number of individual elements, components and units cited herein for carrying out an operating mode described herein. In addition, in the case of the value ranges specified in this description, values falling within the cited limits are also to be considered disclosed and arbitrarily usable.

BRIEF DESCRIPTION OF THE DRAWINGS

Further advantages result from the description of the figures. Four exemplary embodiments of the present invention are represented in the figures. The figures and the description disclose numerous features in combination. Those skilled in the art will also advantageously consider the features separately and combine them to form meaningful further combinations, in view of the disclosure herein.

DETAILED DESCRIPTION OF EXAMPLE EMBODIMENTS

Figure 1:
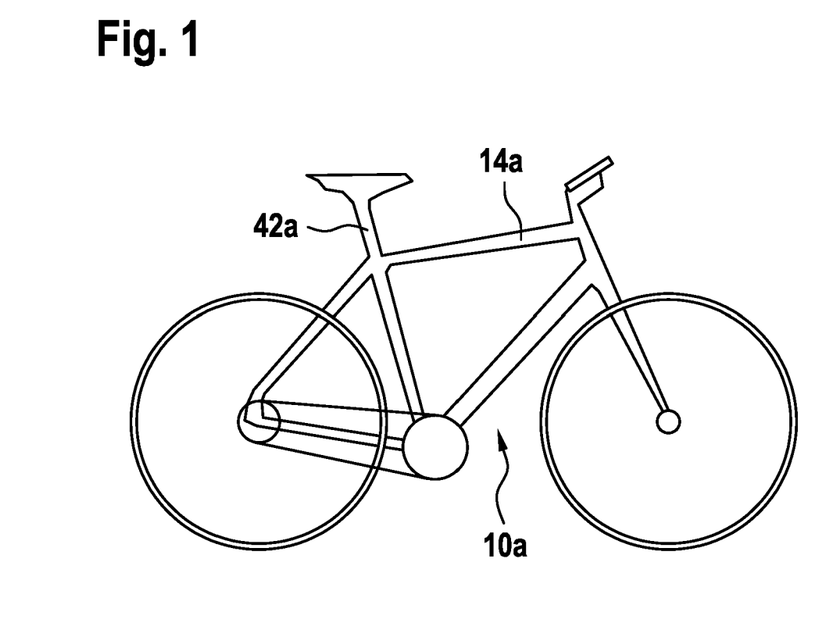
FIG. 1 schematically shows a representation of a bicycle including a frame according to an example embodiment of the present invention, which includes a holding device according to an example embodiment of the present invention, in a side view.
Figure 2:
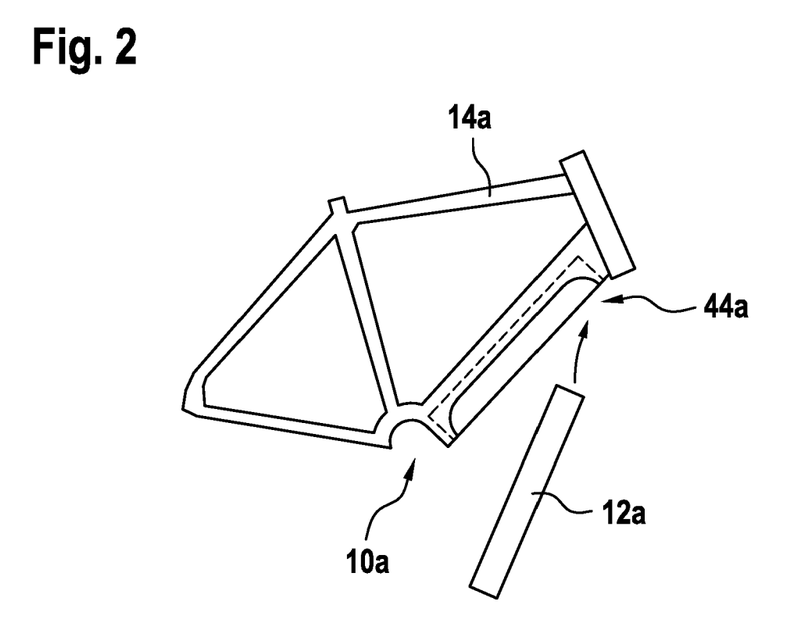
FIG. 2 schematically shows a representation of the frame according to an example embodiment of the present invention in a side view.

FIG. 1 shows a bicycle 42a. Bicycle 42a is designed as an electric bicycle. Bicycle 42a includes an energy store 12a. Energy store 12a is designed as a bicycle energy store. Energy store 12a is designed as an accumulator. Bicycle 42a includes a frame 14a, which is represented in greater detail in FIG. 2. Frame 14a is designed as a bicycle frame. Frame 14a includes a recess 44a. Recess 44a is designed as an indentation of frame 14a. Recess 44a is used to receive energy store 12a. Energy store 12a is insertable into recess 44a. Energy store 12a is insertable, pivotable or tiltable into recess 44a.

Figure 3:
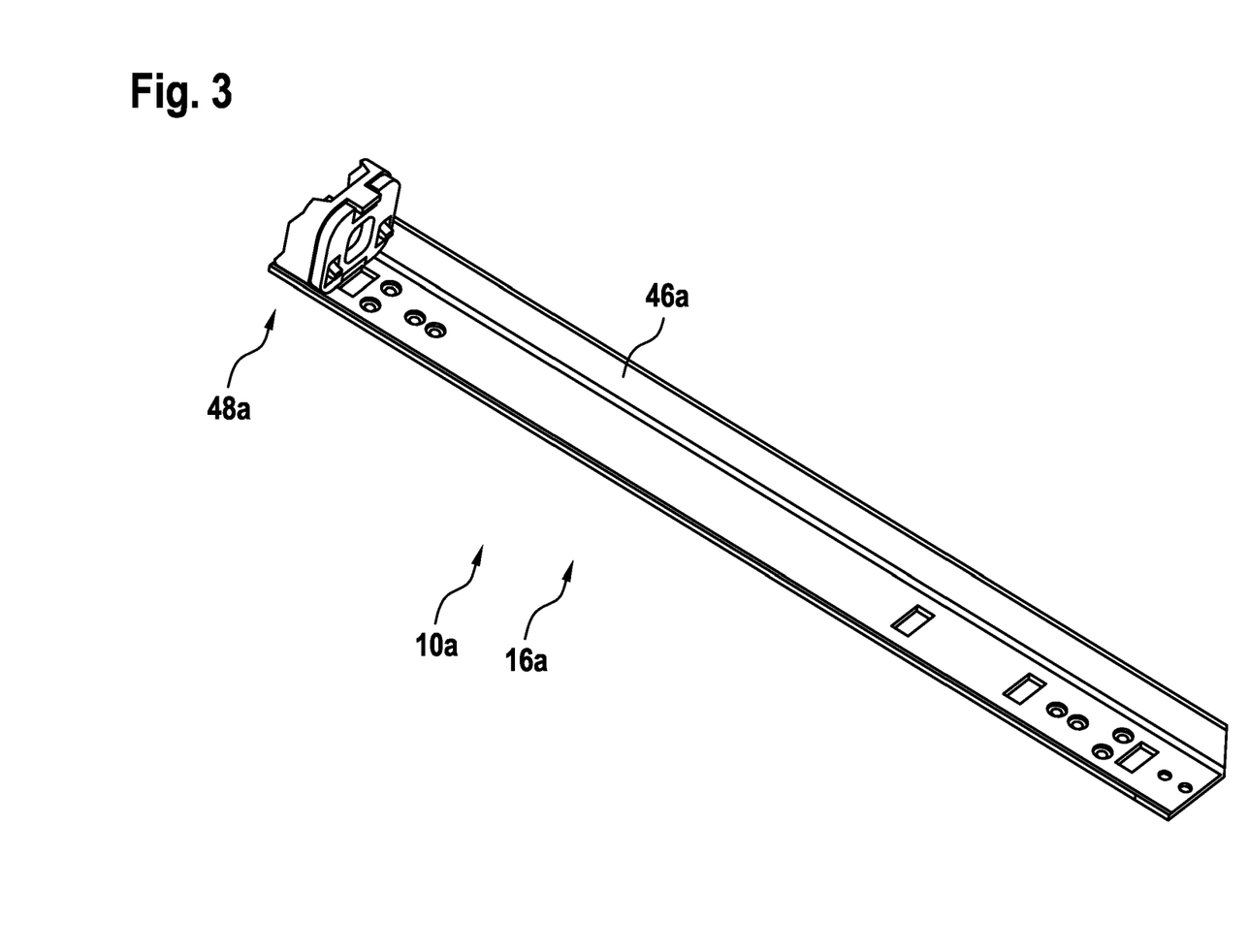
FIG. 3 schematically shows a representation of a part of the holding device according to an example embodiment of the present invention in an oblique view.
Figure 4:
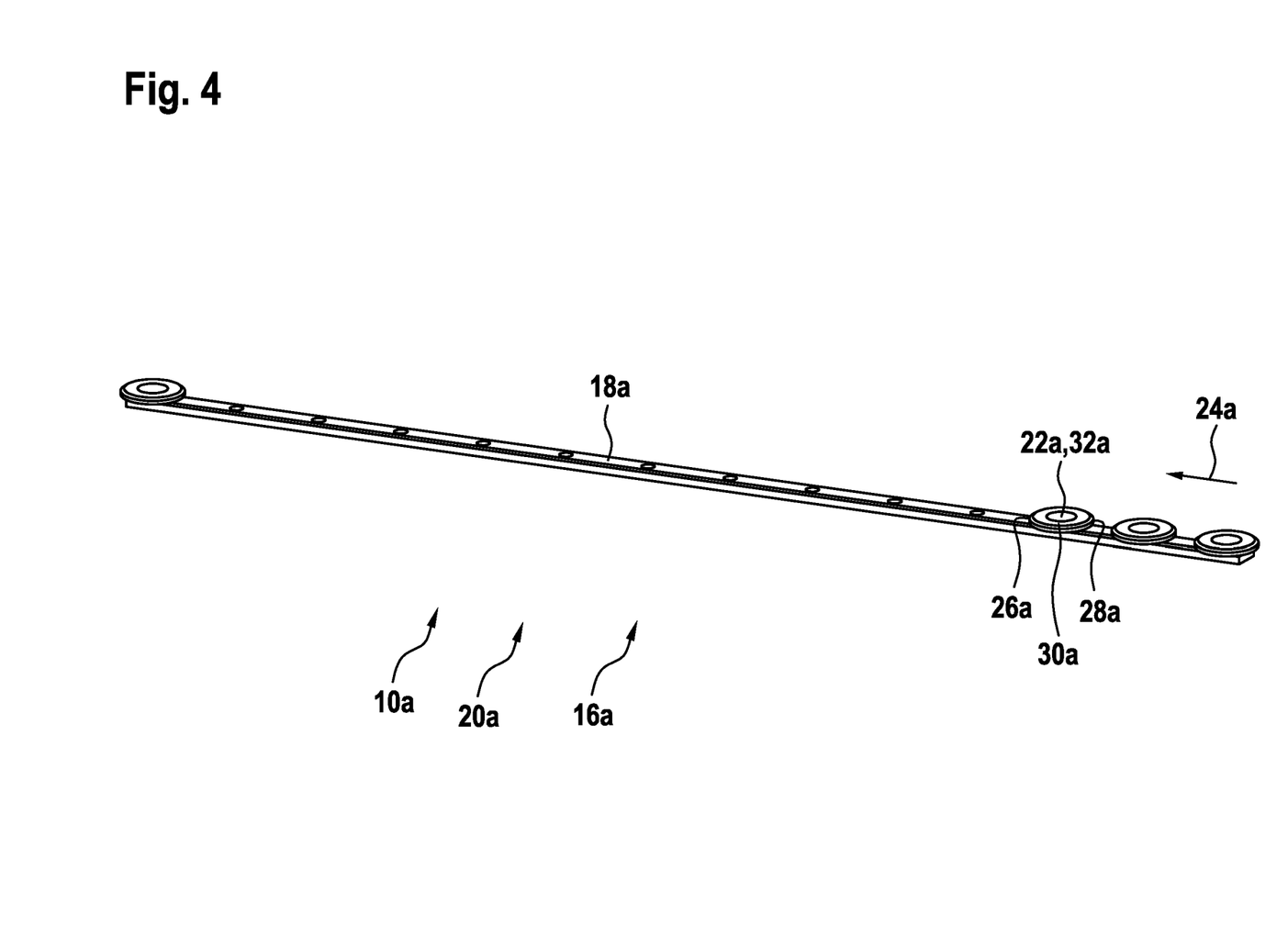
FIG. 4 schematically shows a representation of a support unit of the holding device according to an example embodiment of the present invention.
Figure 5A:
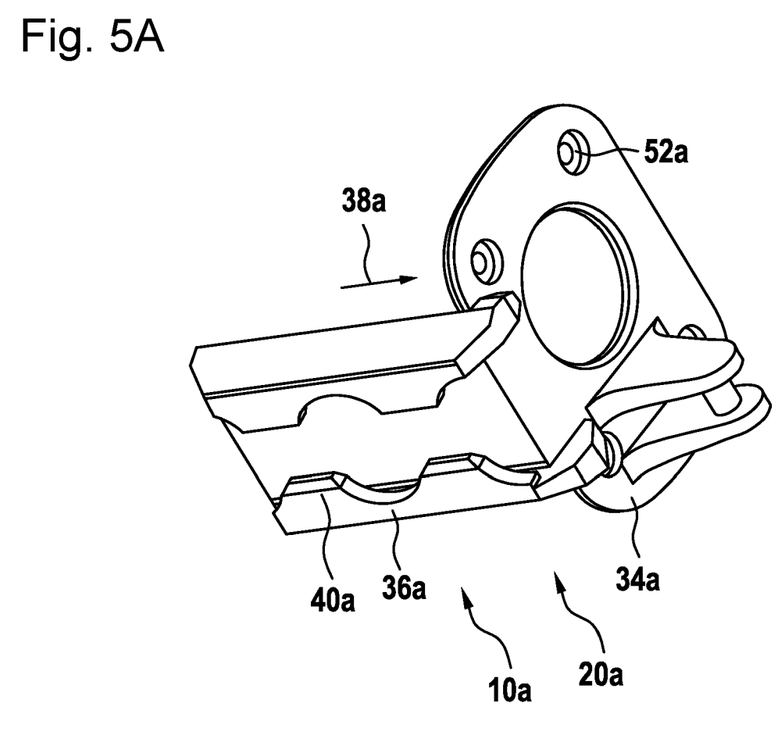
FIGS. 5A and 5B schematically show two representations of a security bar element of the holding device according to an example embodiment of the present invention in a dismounted and a mounted state in an oblique view.
Figure 5B:
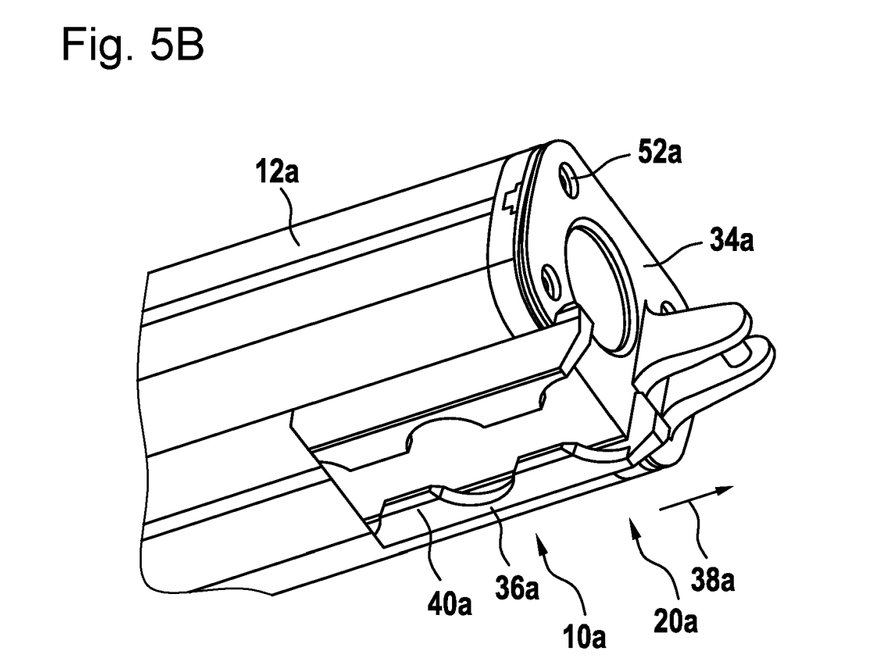

Frame 14a includes a holding device 10a, which is represented in greater detail in FIGS. 3 through 5. Holding device 10a is used for releasably holding energy store 12a at frame 14a. Holding device 10a includes a carrier unit 16a. Carrier unit 16a includes a carrier frame 46a, which is represented in greater detail in FIG. 3. Carrier frame 46a is situated within recess 44a. Carrier frame 46a is glued to frame 14a. Carrier unit 16a includes a contacting unit 48a. Contacting unit 48a is fastened at one end of carrier frame 46a. Contacting unit 48a is used for electrically contacting and locking energy store 12a.

Carrier unit 16a includes a carrier element 18a, which is represented in greater detail in FIG. 4. Carrier element 18a is designed as a guide bar. Carrier element 18a includes a longitudinal axis 24a. Carrier element 18a is glued to carrier frame 46a. Carrier element 18a is used to receive and guide energy store 12a. Holding device 10a includes a support unit 20a. Support unit 20a is used to secure energy store 12a in a form-fit manner at carrier unit 16a.

Support unit 20a includes a plurality of support elements 22a situated at carrier element 18a. Support elements 22a are situated in a distributed manner along longitudinal axis 24a of carrier element 18a. Support elements 22a are designed identically to one another, hence, only one of support elements 22a is described below. Support element 22a is designed as one piece with carrier element 18a. Support element 22a secures energy store 12a at carrier element 18a in a state of energy store 12a in which it is situated at carrier element 18a along a direction extending transversely to longitudinal axis 24a of carrier element 18a.

Support element 22a includes a first end area 26a. Support element 22a includes a second end area 28a. End areas 26a, 28a delimit support element 22a with respect to longitudinal axis 24a of carrier element 18a. Support element 22a has a shape tapering toward end areas 26a, 28a as viewed along longitudinal axis 24a of carrier element 18a. Support element 22a has a circular shape as viewed perpendicularly to a main extension plane (not represented) of support element 22a.

Support element 22a includes an insert element 30a. Insert element 30a is used to securely insert energy store 12a perpendicularly to longitudinal axis 24a of carrier element 18a. Insert element 30a is designed as an end area of support element 22a facing energy store 12a. Insert element 30a is designed to taper toward energy store 12a. Support element 22a is designed as a ball ring.

Support element 22a includes a slide element 32a. Slide element 32a is used to reduce friction during a guiding of energy store 12a when arranging energy store 12a at carrier element 18a. Slide element 32a is made of Teflon. Support element 22a is formed completely by slide element 32a.

Support unit 20a includes a security bar element 34a, which is represented in FIG. 5A. Security bar element 34a includes four screw holes 52a. Screw holes 52a are used to screw on security bar element 34a at one end of energy store 12a. FIG. 5B shows security bar element 34a in a state of security bar element 34a screwed on at the end of energy store 12a. Security bar element 34a includes three receiving areas 36a for support element 22a, which are designed functionally identically to one another, hence, only one of receiving areas 36a is described below. Security bar element 34a includes two support areas 40a for support element 22a. Support areas 40a are situated along a longitudinal axis 38a of security bar element 34a adjacent to receiving area 36a. Support areas 40a are designed identically to one another, hence, only one of support areas 40a is described below. Support area 40a defines a receptacle for support element 22a.

Support element 22a is designed as an undercut. Support element 22a forms a form-fit by receiving support element 22a in the receptacle defined by support area 40a. A formation of the form-fit includes a placing of security bar element 34a onto support element 22a. During placement of security bar element 34a, receiving area 36a receives support element 22a. The placement of security bar element 34a is followed by a relative movement of security bar element 34a along longitudinal axis 38a of security bar element 34a. During the relative movement of security bar element 34a, the receptacle defined by support area 40a receives support element 22a. The form-fit prevents a relative movement of support element 22a and of security bar element 34a to one another perpendicular to longitudinal axis 38a of security bar element 34a.

A length of the relative movement of security bar element 34a corresponds to a diameter of support element 22a as viewed perpendicularly to the main extension plane of support element 22a. In this way, a maximum encompassing of support element 22a by support area 40a and a minimal play of support element 22a in the receptacle defined by support area 40a may be achieved. Alternatively, a length of the relative movement could also be only a portion of the diameter of support element 22a.

Three further exemplary embodiments of the present invention are shown in FIGS. 6 through 10. The following descriptions and the drawings are limited essentially to the differences between the exemplary embodiments, reference may be made with respect to identically identified components, in particular, with reference to components having the same reference numeral, in principle also to the drawings and/or to the description of the other exemplary embodiments, in particular, of FIGS. 1 through 5B. To differentiate between the exemplary embodiments, the letter a is placed after the reference numeral of the exemplary embodiment in FIGS. 1 through 5B. In the exemplary embodiments of FIGS. 6 through 10, the letter a is replaced by the letters b through d.

Figure 6:
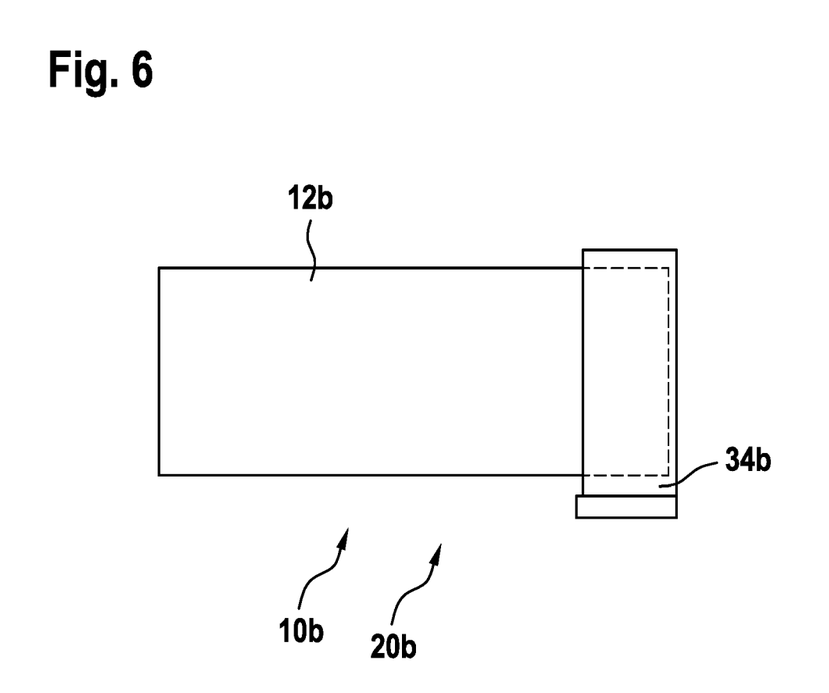
FIG. 6 schematically shows a representation of a security bar element of a further exemplary embodiment of a holding device according to the present invention in a mounted state in a side view.
Figure 7:
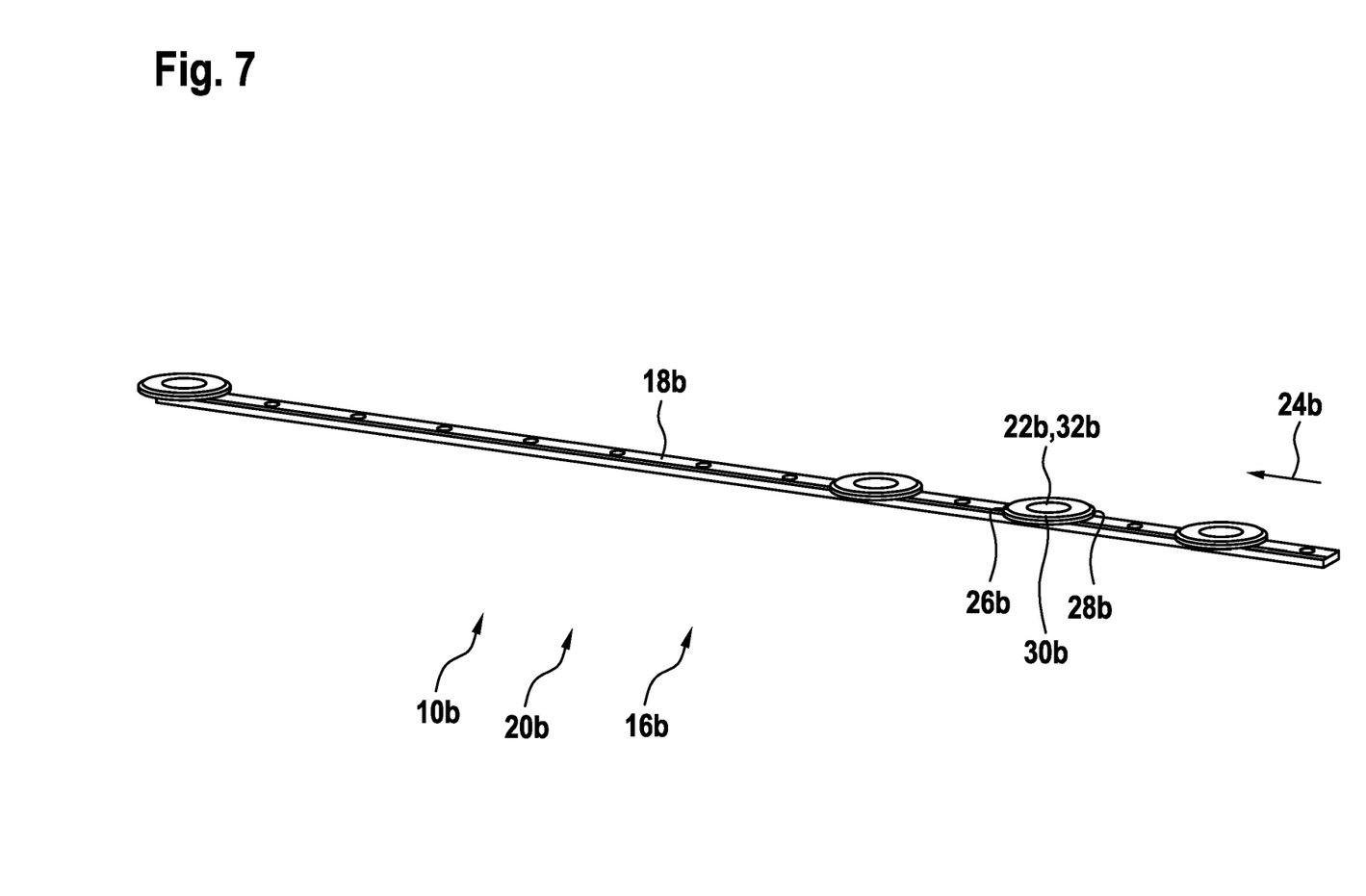
FIG. 7 schematically shows a representation of a support unit of the holding device according to an example embodiment of the present invention from FIG. 6.

A further holding device 10b is represented in FIGS. 6 and 7. Holding device 10b includes a support unit 20b. Support unit 20b includes a security bar element 34b. Security bar element 34b encompasses an end of energy store 12b of a bicycle not represented.

Support unit 20b includes support elements 22b, which are designed identically to one another, hence, only one of support elements 22b is described in the following. Support element 22a has an oval shape as viewed perpendicularly to a main extension plane (not represented) of support element 22b. The use of an oval shape, as compared to a circular shape, ensures an increased contact surface and an improved guidance of energy store 12b.

Figure 8:
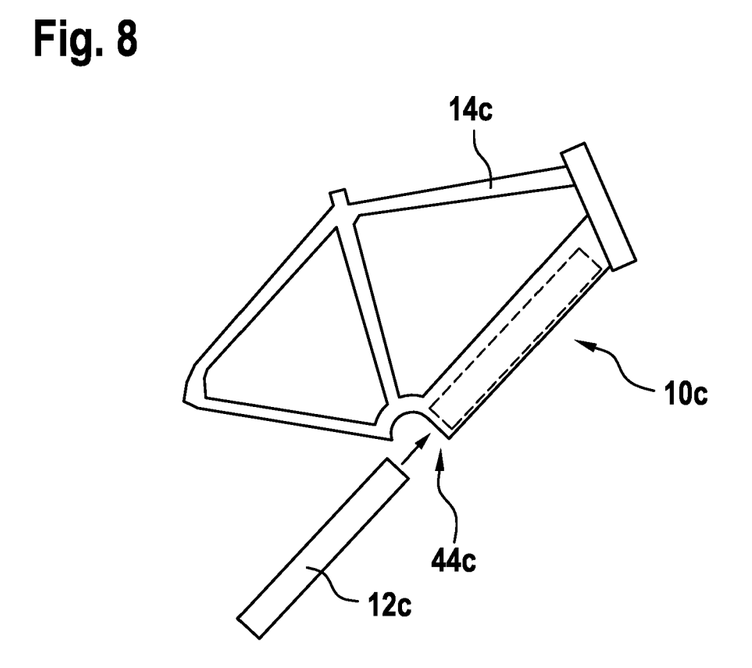
FIG. 8 schematically shows a representation of a further exemplary embodiment of a frame according to the present invention including a holding device according to an example embodiment of the present invention.

FIG. 8 shows a further frame 14c including a holding device 10c. Frame 14c includes a recess 44c. Recess 44c is designed as a cavity of frame 14c. An energy store 12c of a bicycle not represented is insertable into recess 44a.

Figure 9:
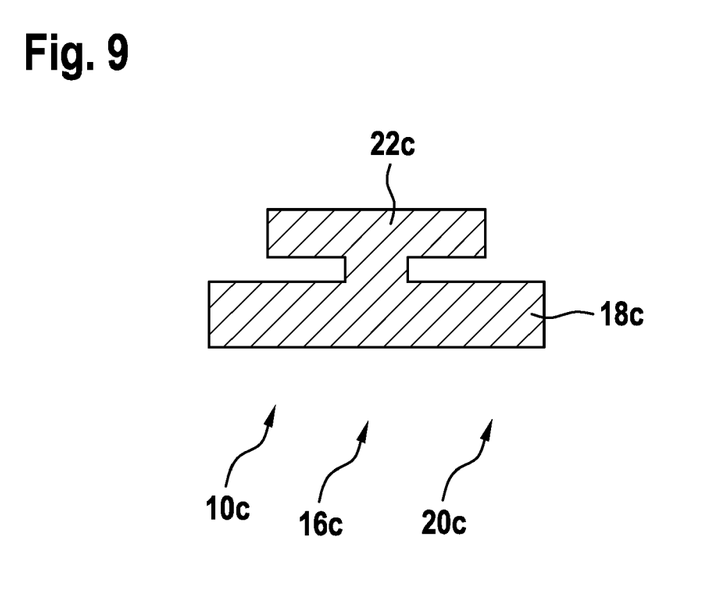
FIG. 9 schematically shows a cross-sectional representation of a support unit of the holding device according to the present invention from FIG. 8.

Holding device 10c includes a support unit 20c, which is shown in FIG. 9 in a cross-sectional representation. Support unit 20c includes a support element 22c. Support element 22c is designed as a T-bar.

Figure 10:
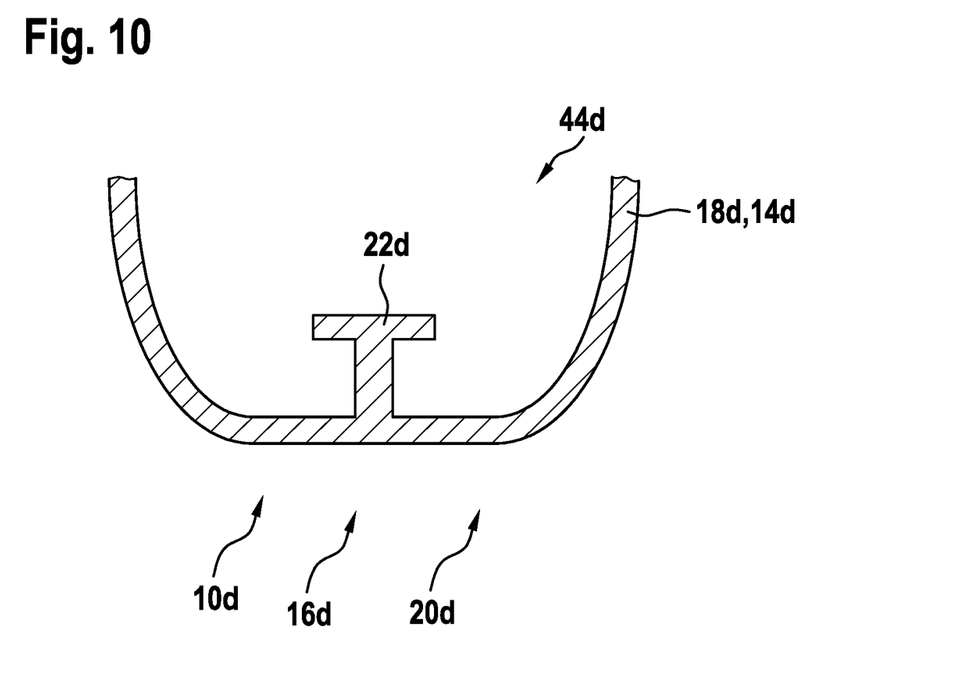
FIG. 10 schematically shows a cross-sectional representation of a further exemplary embodiment of a holding device according to the present invention of the frame according to the present invention from FIG. 8.

FIG. 10 shows a portion of a further frame 14d including a holding device 10d. Frame 14d includes a recess (not represented) which is designed as a cavity. Holding device 10d includes a support unit 20d. Support unit 20d includes a support element 22d. Support element 22d is designed as a T-bar. Holding device 10d includes a carrier unit 16d. Carrier unit 16d includes a carrier element 18d. Carrier element 18d is designed as one piece with frame 14d. In this way, a mounting of carrier element 18d at frame 14d may be dispensed with.

What is claimed is:

1. A holding device for releasably holding an energy store at a frame, the holding device comprising:
   at least one carrier unit, which includes at least one carrier element configured to at least partially receive and/or guide the energy store; and
   at least one support unit configured to secure the energy store in a form-fit manner at the carrier unit;
   wherein the support unit includes at least one support element, situated at the carrier element, configured to secure the energy store at the carrier element in a state in which the energy store is situated at the carrier element at least along a direction at the carrier element extending transversely to a longitudinal axis of the carrier element,
   wherein the support element at least one of:
      has a shape tapering toward end areas of the support element as viewed along the longitudinal axis of the carrier element;
      includes at least one insert element configured to securely insert the energy store perpendicularly to the longitudinal axis of the carrier element; or
      is configured as an undercut.

2. The holding device as recited in claim 1, wherein the energy store is a bicycle energy store and the frame is a bicycle frame.

3. The holding device as recited in claim 1, wherein the carrier element is a guide bar.

4. The holding device as recited in claim 1, wherein the support element is one piece with the carrier element.

5. The holding device as recited in claim 1, wherein the support element has a shape tapering toward end areas of the support element as viewed along the longitudinal axis of the carrier element.

6. The holding device as recited in claim 1, wherein the support element includes at least one insert element configured to securely insert the energy store perpendicularly to the longitudinal axis of the carrier element.

7. The holding device as recited in claim 1, wherein the support element includes at least one slide element.

8. The holding device as recited in claim 1, wherein the support element is configured as an undercut.

9. A holding device for releasably holding an energy store at a frame, the holding device comprising:
   at least one carrier unit, which includes at least one carrier element configured to at least partially receive and/or guide the energy store; and
   at least one support unit configured to secure the energy store in a form-fit manner at the carrier unit;
   wherein the support unit includes at least one support element, situated at the carrier element, configured to secure the energy store at the carrier element in a state in which the energy store is situated at the carrier element at least along a direction at the carrier element extending transversely to a longitudinal axis of the carrier element,
   wherein the support unit includes a plurality of support elements situated at the carrier element, which are situated in a distributed manner along the longitudinal axis of the carrier element.

10. A holding device for releasably holding an energy store at a frame, the holding device comprising:
   at least one carrier unit, which includes at least one carrier element configured to at least partially receive and/or guide the energy store; and
   at least one support unit configured to secure the energy store in a form-fit manner at the carrier unit;
   wherein the support unit includes at least one support element, situated at the carrier element, configured to secure the energy store at the carrier element in a state in which the energy store is situated at the carrier element at least along a direction at the carrier element extending transversely to a longitudinal axis of the carrier element, wherein the support unit includes at least one security bar element, which includes at least one receiving area for the support element and support areas for the support element situated along its longitudinal axis adjacent to the receiving area.

11. A frame comprising a holding device for releasably holding an energy store at the frame, the holding device including:
- at least one carrier unit, which includes at least one carrier element configured to at least partially receive and/or guide the energy store; and
- at least one support unit configured to secure the energy store in a form-fit manner at the carrier unit;
- wherein the support unit includes at least one support element, situated at the carrier element, configured to secure the energy store at the carrier element in a state in which the energy store is situated at the carrier element at least along a direction at the carrier element extending transversely to a longitudinal axis of the carrier element,
- wherein the support element at least one of:
  - has a shape tapering toward end areas of the support element as viewed along the longitudinal axis of the carrier element;
  - includes at least one insert element configured to securely insert the energy store perpendicularly to the longitudinal axis of the carrier element; or
  - is configured as an undercut,
- wherein the frame is a bicycle frame.

* * * * *